US011985359B2

(12) United States Patent
Kim et al.

(10) Patent No.: US 11,985,359 B2
(45) Date of Patent: *May 14, 2024

(54) SAMPLE ADAPTIVE OFFSET (SAO) PARAMETER SIGNALING

(71) Applicant: TEXAS INSTRUMENTS INCORPORATED, Dallas, TX (US)

(72) Inventors: Woo-Shik Kim, San Diego, CA (US); Do-Kyoung Kwon, Allen, TX (US); Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,568

(22) Filed: Dec. 15, 2023

(65) Prior Publication Data

US 2024/0114175 A1  Apr. 4, 2024

Related U.S. Application Data

(63) Continuation of application No. 17/355,701, filed on Jun. 23, 2021, now Pat. No. 11,849,154, which is a (Continued)

(51) Int. Cl.
*H04N 19/00* (2014.01)
*H04N 19/117* (2014.01)
(Continued)

(52) U.S. Cl.
CPC .......... *H04N 19/86* (2014.11); *H04N 19/117* (2014.11); *H04N 19/186* (2014.11);
(Continued)

(58) Field of Classification Search
CPC ........ H04N 19/91; H04N 19/80; H04N 19/70; H04N 19/86; H04N 19/463; H04N 19/186; H04N 19/82; H04N 19/117
See application file for complete search history.

(56) References Cited

U.S. PATENT DOCUMENTS

2012/0106624 A1   5/2012  Huang et al.
2012/0177103 A1*  7/2012  Fu ..................... H04N 19/176
                                                   375/E7.076
(Continued)

FOREIGN PATENT DOCUMENTS

WO   2012/092841 A1    7/2012
WO   2012/142966 A1   10/2012

OTHER PUBLICATIONS

Ken Mccann et al, "Samsung's Response to the Call for Proposals on Video Compression Technology", JCTVC-A124, Joint Collaborative Team on Video Coding (JCT-VC) of ITU-T SG16 WP3 and ISO/IEC JTC1/SC29/W11, pp. 1-40, Apr. 15-23, 2010, Dresden, Germany.

(Continued)

*Primary Examiner* — Zhihan Zhou
(74) *Attorney, Agent, or Firm* — Carl G. Peterson; Frank D. Cimino

(57) ABSTRACT

Techniques for signaling of sample adaptive offset (SAO) information that may reduce the coding rate for signaling such information in the compressed bit stream are provided. More specifically, techniques are provided that allow SAO information common to two or more of the color components to be signaled using one or more syntax elements (flags or indicators) representative of the common information. These techniques reduce the need to signal SAO information separately for each color component.

20 Claims, 5 Drawing Sheets

Related U.S. Application Data continuation of application No. 15/192,547, filed on Jun. 24, 2016, now Pat. No. 11,076,174, which is a continuation of application No. 13/775,064, filed on Feb. 22, 2013, now Pat. No. 9,380,302, which is a continuation-in-part of application No. 13/593,973, filed on Aug. 24, 2012, now Pat. No. 10,070,152.

(60) Provisional application No. 61/654,193, filed on Jun. 1, 2012, provisional application No. 61/641,998, filed on May 3, 2012, provisional application No. 61/637,421, filed on Apr. 24, 2012, provisional application No. 61/636,075, filed on Apr. 20, 2012, provisional application No. 61/619,554, filed on Apr. 3, 2012, provisional application No. 61/616,470, filed on Mar. 28, 2012, provisional application No. 61/603,629, filed on Feb. 27, 2012, provisional application No. 61/603,670, filed on Feb. 27, 2012.

(51) Int. Cl.
| | |
|---|---|
| H04N 19/186 | (2014.01) |
| H04N 19/463 | (2014.01) |
| H04N 19/70 | (2014.01) |
| H04N 19/80 | (2014.01) |
| H04N 19/82 | (2014.01) |
| H04N 19/86 | (2014.01) |
| H04N 19/91 | (2014.01) |

(52) U.S. Cl.
CPC ........... *H04N 19/463* (2014.11); *H04N 19/70* (2014.11); *H04N 19/80* (2014.11); *H04N 19/82* (2014.11); *H04N 19/91* (2014.11)

(56) References Cited

U.S. PATENT DOCUMENTS

| | | | | |
|---|---|---|---|---|
| 2012/0177107 | A1* | 7/2012 | Fu | H04N 19/70 375/240.03 |
| 2012/0294353 | A1* | 11/2012 | Fu | H04N 19/186 375/E7.126 |
| 2012/0327999 | A1 | 12/2012 | Francois et al. | |
| 2013/0101018 | A1* | 4/2013 | Chong | H04N 19/82 375/E7.026 |
| 2013/0188687 | A1* | 7/2013 | Bjontegaard | H04N 19/10 375/240.02 |
| 2013/0215959 | A1* | 8/2013 | Chen | H04N 19/117 375/240.02 |
| 2013/0259118 | A1* | 10/2013 | Fu | H04N 19/169 375/240.02 |
| 2013/0322523 | A1* | 12/2013 | Huang | H04N 19/134 375/240.02 |
| 2013/0329784 | A1* | 12/2013 | Chuang | H04N 19/176 375/240.02 |
| 2014/0369420 | A1* | 12/2014 | Alshina | H04N 19/96 375/240.25 |

OTHER PUBLICATIONS

Yu-Wen Huang et al, "In-Loop Adaptive Restoration", JCTVC-B077, Joint Collaborative Team on Video Coding (JCT-VC) of ITU-T SG16 WP3 and ISO/IEC JTC1/SC29/W11, pp. 1-11, Jul. 21-28, 2010, Geneva, Switzerland.

Chih-Ming Fu et al, "TE10 Subtest 3: Quadtree-based Adaptive Offset", JCTVC-C147, Joint Collaborative Team on Video Coding (JCT-VC) of ITU-T SG16 WP3 and ISO/IEC JTC1/SC29/W11, pp. 1-6, Oct. 7-15, 2010, Guangzhou, China.

Chih-Ming Fu et al, "CE8 Subset3: Picture Quadtree Adaptive Offset", JCTVC-D122, Joint Collaborative Team on Video Coding (JCT-VC) of ITU-T SG16 WP3 and ISO/IEC JTC1/SC29/W11, pp. 1-10, Jan. 20-28, 2011, Daegu, Korea.

Chih-Ming Fu et al, "CE8 Subset3: Picture Quadtree Adaptive Offset", JCTVC-D122 Presentation, Joint Collaborative Team on Video Coding (JCT-VC) of ITU-T SG16 WP3 and ISO/IEC JTC1/SC29/W11, pp. 1-9, Jan. 20-28, 2011, Daegu, Korea.

Chih-Ming Fu et al, "CE13: Sample Adaptive Offset with LCU-Independent Decoding", JCTVC-E049, Joint Collaborative Team on Video Coding (JCT-VC) of ITU-T SG16 WP3 and ISO/IEC JTC1/SC29/W11, pp. 1-6, Mar. 16-23, 2011, Geneva, Switzerland.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/W11, pp. 1-215, Mar. 16-23, 2011, Geneva, Switzerland.

Benjamin Bross et al,"WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/W11, pp. 1-217, Jul. 14-22, 2011, Torino, Italy.

"TMS320DM6467 Digital Media System-on-Chip", SPRS403G, Texas Instruments Incorporated, Dec. 2007, revised Oct. 2010, pp. 1-355.

Chih-Ming Fu et al, "Sample Adaptive Offset for HEVC", 2011 IEEE 13th International Workshop on Multimedia Signal Processing (MMSP), pp. 1-5, Oct. 17-19, 2011, Hangzhou, China.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/W11, pp. 1-293, Oct. 10-19, 2012, Shanghai, China.

Guillaume Laroche et al, "Non-CE1: On SAO Parameters Reduction for Chroma", JCTVC-I0183, Joint Collaborative Team on Video Coding (JCT-VC) of ITU-T SG16 WP3 and ISO/IEC JTC1/SC29/W11, pp. 1-5, Apr. 27-May 7, 2012, Geneva, Switzerland.

Do-Kyoung Kwon and Woo-Shik Kim, "Non-CE1: Edge Offset Index Coding for LCU-Based SAO", JCTVC-I0261, Joint Collaborative Team on Video Coding (JCT-VC) of ITU-T SG16 WP3 and ISO/IEC JTC1/SC29/W11, pp. 1-5, Apr. 27-May 7, 2012, Geneva, Switzerland.

Koohyar Minoo et al, "Non-CE1: Coding of SAO Merge Left and Merge Up", JCTVC-I0507, Joint Collaborative Team on Video Coding (JCT-VC) of ITU-T SG16 WP3 and ISO/IEC JTC1/SC29/W11, pp. 1-7, Apr. 27-May 7, 2012, Geneva, Switzerland.

Koohyar Minoo et al, "Non-CE1: Coding of SAO Merge Left and Merge Up", JCTVC-I0507 Presentation, Joint Collaborative Team on Video Coding (JCT-VC) of ITU-T SG16 WP3 and ISO/IEC JTC1/SC29/W11, pp. 1-4, Apr. 27-May 7, 2012, Geneva, Switzerland.

Elena Alshina et al, "Non-CE1: On SAO Type Sharing Between Color Component", JCTVC-0590, Joint Collaborative Team on Video Coding (JCT-VC) of ITU-T SG16 WP3 and ISO/IEC JTC1/SC29/W11, pp. 1-10, Apr. 27-May 7, 2012, Geneva, Switzerland.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/W11, pp. 1-256, Apr. 27-May 7, 2012, Geneva, Switzerland.

E. Alshina et al, "AhG6: On SAO Type Sharing Between U and V Components", JCTVC-J0045, Joint Collaborative Team on Video Coding (JCT-VC) of ITU-T SG16 WP3 and ISO/IEC JTC1/SC29/W11, pp. 1-7, Jul. 11-20, 2012, Stockholm, Sweden.

E. Alshina et al, "AhG6: On SAO Type Sharing Between U and V Components", JCTVC-J0045 Presentation, Joint Collaborative Team on Video Coding (JCT-VC) of ITU-T SG16 WP3 and ISO/IEC JTC1/SC29/W11, pp. 1-9, Jul. 11-20, 2012, Stockholm, Sweden.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/W11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/W11, pp. 1-249, Nov. 21-30, 2011, Geneva, Switzerland.

(56) References Cited

OTHER PUBLICATIONS

Chih-Ming Fu et al, "CE8.a.3: SAO with LCU-Based Syntax", JCTVC-H0273, Joint Collaborative Team on Video Coding (JCT-VC) of ITU-T SG16 WP3 and ISO/IEC JTC1/SC29/W11, pp. 1-8, Feb. 1-10, 2012, San Jose, CA.

Koohyar Minoo and David Baylon, "Coding of SAO Merge Left and Merge Up Flags", JCTVC-J0355-r2, Joint Collaborative Team on Video Coding (JCT-VC) of ITU-T SG16 WP3 and ISO/IEC JTC1/SC29/W11, pp. 1-8, Jul. 11-20, Stockholm, Sweden.

Koohyar Minoo and David Baylon, "Coding of SAO Merge Left and Merge Up Flags", JCTVC-J0355-r2 Presentation, Joint Collaborative Team on Video Coding (JCT-VC) of ITU-T SG16 WP3 and ISO/IEC JTC1/SC29/W11, pp. 1-8, Jul. 11-20, Stockholm, Sweden.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/W11, pp. 1-250, Jul. 11-20, 2012, Stockholm, Sweden.

\* cited by examiner

SAMPLE ADAPTIVE OFFSET (SAO) PARAMETER SIGNALING

CROSS-REFERENCE TO RELATED APPLICATIONS

This application is a continuation of U.S. patent application Ser. No. 17/355,701, filed Jun. 23, 2021, currently pending and scheduled to grant as U.S. Pat. No. 11,849,154 on Dec. 19, 2023, which is a continuation of U.S. patent application Ser. No. 15/192,547, filed Jun. 24, 2016 (now U.S. Pat. No. 11,076,174), which is a continuation of U.S. patent application Ser. No. 13/775,064, filed Feb. 22, 2013 (now U.S. Pat. No. 9,380,302), which claims benefit of U.S. Provisional Patent Application No. 61/603,629, filed Feb. 27, 2012, U.S. Provisional Patent Application No. 61/603,670, filed Feb. 27, 2012, U.S. Provisional Patent Application No. 61/616,470, filed Mar. 28, 2012, U.S. Provisional Patent Application No. 61/619,554, filed Apr. 3, 2012, U.S. Provisional Patent Application No. 61/636,075, filed Apr. 20, 2012, U.S. Provisional Patent Application No. 61/637,421, filed Apr. 24, 2012, U.S. Provisional Patent Application No. 61/641,998, filed May 3, 2012, and U.S. Provisional Patent Application No. 61/654,193, filed Jun. 1, 2012, each of which is incorporated herein by reference in its entirety.

This application is a continuation-in-part of co-pending U.S. patent application Ser. No. 13/593,973, filed Aug. 24, 2012 (now U.S. Pat. No. 10,070,152), which is incorporated by reference herein in its entirety.

BACKGROUND

Field of the Invention

Embodiments of the present invention generally relate to sample adaptive offset (SAO) parameter signaling in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the emerging HEVC standard defines three in-loop filters: a deblocking filter to reduce blocking artifacts, a sample adaptive offset filter (SAO) to reduce distortion caused by intensity shift, and an adaptive loop filter (ALF) to minimize the mean squared error (MSE) between reconstructed video and original video. These filters may be applied sequentially, and, depending on the configuration, the SAO and ALF loop filters may be applied to the output of the deblocking filter.

SUMMARY

Embodiments of the present invention relate to methods, apparatus, and computer readable media for sample adaptive offset (SAO) parameter signaling. In one aspect, a method for sample adaptive offset (SAO) parameter signaling in a video encoder is provided that includes determining, for a largest coding unit (LCU) of a reconstructed picture, SAO parameters for Y, Cb, and Cr color components of the LCU, wherein the determining includes determining whether or not SAO filtering is to be applied to the color components, entropy encoding a first flag in a compressed video bit stream, the first flag indicating whether or not SAO filtering of the Y color component is enabled for the LCU, and entropy encoding a second flag in the compressed video bit stream, the second flag indicating whether or not SAO filtering of the Cb and Cr components is enabled.

In one aspect, a method for sample adaptive offset (SAO) parameter signaling in a video encoder is provided that includes determining, for a largest coding unit (LCU) of a reconstructed picture, SAO parameters for Y, Cb, and Cr color components of the LCU, and entropy encoding SAO information for the LCU in a compressed video bit stream, wherein the SAO information comprises a combined flag signaling information applicable to all three color components.

In one aspect, a method for sample adaptive offset (SAO) filtering in a video decoder is provided that includes entropy decoding a first flag from a compressed video bit stream, the first flag indicating whether or not SAO filtering of a Y color component of an LCU is enabled for the LCU, entropy decoding a second flag from the compressed video bit stream, the second flag indicating whether or not SAO filtering of Cb and Cr components of the LCU is enabled, and applying SAO filtering to the Y, Cb, and Cr components based on the first flag and the second flag.

In one aspect, a method for sample adaptive offset (SAO) filtering in a video decoder is provided that includes entropy decoding SAO information for an LCU from a compressed video bit stream, wherein the SAO information comprises a combined flag signaling information applicable to all three color components of the LCU, and applying SAO filtering to the three color components of the LCU based on the combined flag.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
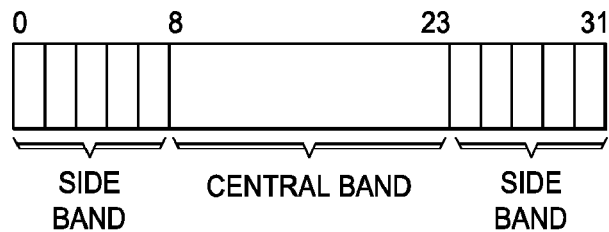
FIG. 1 illustrates band offset (BO) classification in sample adaptive offset (SAO) filtering.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, California, Feb. 1-10, 2012, ("HEVC Draft 6"), B. Bross, et al., "High Efficiency Video Coding (HEVC) Text Specification Draft 7," JCTVC-I1003_d1, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

As previously mentioned, a sample adaptive offset (SAO) in-loop filter is one of the in-loop filters included in the emerging HEVC standard. These in-loop filters are applied in the encoder and the decoder. SAO may be applied to reconstructed pixels after application of a deblocking filter. In general, SAO involves adding an offset to compensate for intensity shift directly to a reconstructed pixel. The value of the offset depends on the local characteristics surrounding the pixel, i.e., edge direction/shape and/or pixel intensity level. There are two kinds of offsets that may be applied: band offsets (BO) and edge offsets (EO).

To determine band offsets, pixels are classified by intensity level of the corresponding reconstructed pixels. For example, in early versions of HEVC, to determine band offsets, reconstructed pixels are classified into multiple bands where each band contains pixels in the same intensity interval. That is, the intensity range is equally divided into 32 bands from zero to the maximum intensity value (e.g., 255 for 8-bit pixels). Based on the observation that an offset tends to become zero when the number of pixels in a band is large, especially for central bands, the 32 bands are divided into two groups, the central 16 bands and two side bands as shown in FIG. 1. Each pixel is classified according to its intensity into one of two categories: the side band group or the central band group. The five most significant bits of a pixel are used as the band index for purposes of classification. An offset is also determined for each band of the central group and each band of the side band group. The offset for a band may be computed as an average of the differences between the original pixel values and the reconstructed pixel values of the pixels in the color component classified into the band.

Figure 2A:
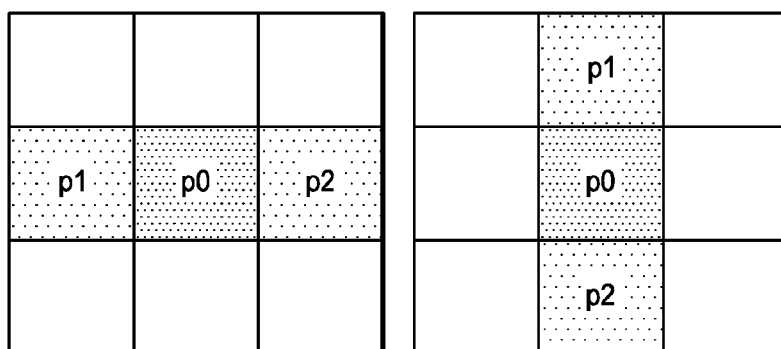
FIG. 2A illustrates edge offset (EO) classification patterns in SAO filtering.
Figure 2A:
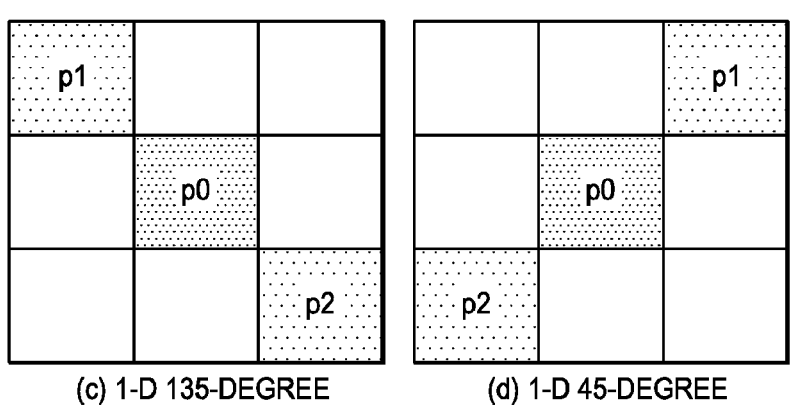
Figure 2B:
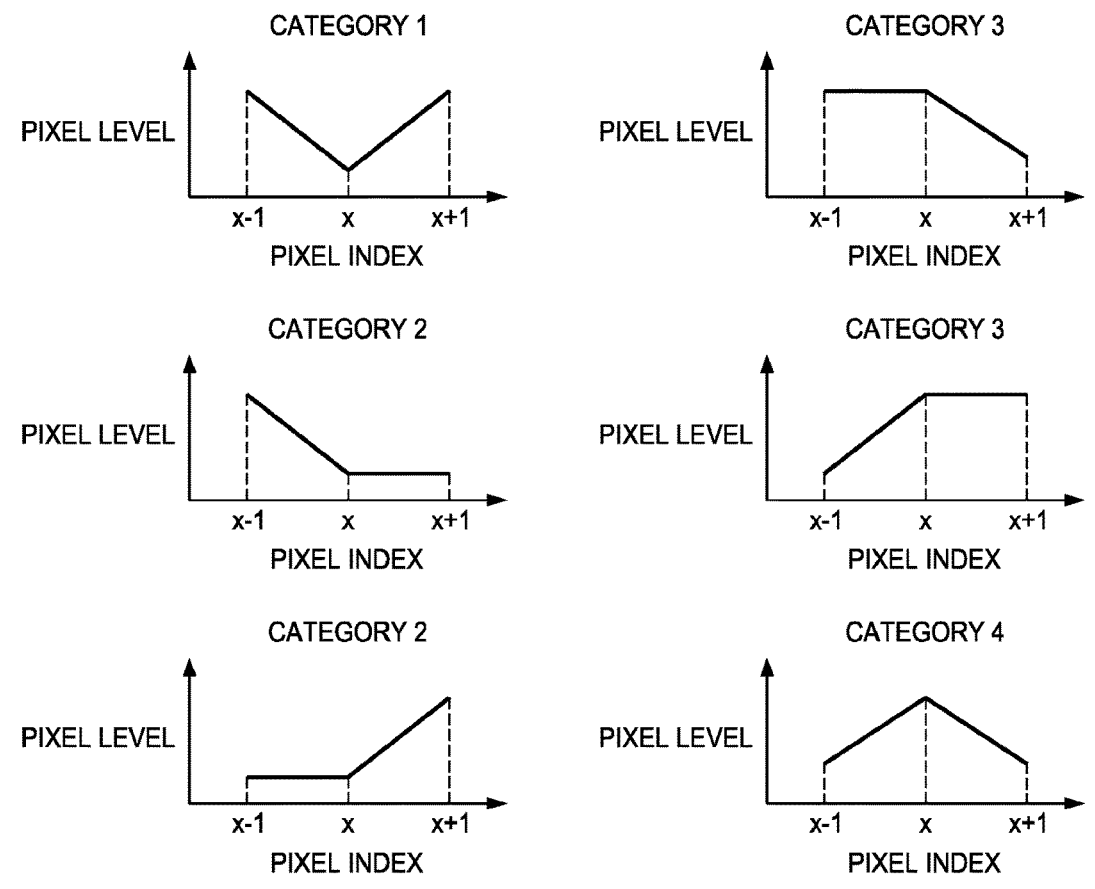
FIG. 2B illustrates edge types by EO category.

To determined edge offsets, reconstructed pixels are classified based on a one dimensional (1-D) delta calculation. That is, the pixels can be filtered in one of four edge directions (0, 90, 135, and 45) as shown in FIG. 2A. For each edge direction, a pixel is classified into one of five categories based on the intensity of the pixel relative to neighboring pixels in the edge direction. Categories 1-4 each represent specific edge shapes as shown in FIG. 2B while category 0 is indicative that none of these edge shapes applies. Offsets for each of categories 1-4 are also computed after the pixels are classified.

More specifically, for each edge direction, a category number c for a pixel is computed as $c=\text{sign}(p0-p1)+\text{sign}(p0-p2)$ where p0 is the pixel and p1 and p2 are neighboring pixels as shown in FIG. 2A. The edge conditions that result in classifying a pixel into a category are shown in Table 1 and are also illustrated in FIG. 2B. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
|---|---|
| 1 | p0 < p1 and p0 < p2 |
| 2 | (p0 < p1 and p0 = p2) or |
|  | (p0 < p2 and p0 = p1) |

TABLE 1-continued

| Category | Condition |
|---|---|
| 3 | (p0 > p1 and p0 = p2) or (p0 > p2 and p0 = p1) |
| 4 | p0 > p1 and p0 > p2 |
| 0 | none of above |

The encoder decides which of the SAO filter types is to be used for each color component, i.e., Y, Cb, and Cr, of a picture. In early versions of HEVC, the encoder partitions a picture into LCU aligned regions and determines SAO filter types and offsets for the color components in the regions. Later versions provide for determining the SAO filter type and offsets for color components at the LCU level.

The encoder may use any suitable criteria for selecting the SAO filter types for the color components. For example, the encoder may decide the best SAO filter type and associated offsets for each color component based on a rate distortion technique that estimates the coding cost resulting from the use of each SAO filter type. More specifically, for each color component, the encoder may estimate the coding costs of SAO parameters, e.g., the SAO filter type and SAO offsets, resulting from using each of the predefined SAO filter types for the color component. The encoder may then select the option with the best coding cost for the color component. Some later versions of HEVC that provide for determining the SAO filter type and offsets at the LCU level provide an option for "merging" LCUs for purposes of signaling SAO parameters in the compressed bit stream. In addition to directly determining the best SAO filter type and offsets for the color components of an LCU, the encoder may also consider the coding costs resulting from using the SAO parameters of corresponding color components in left and upper neighboring LCUs (if these neighboring LCUs are available). If the SAO parameters of one of the neighboring LCUs provide the best coding cost, one or more merge flags (one per color component as appropriate) are signaled in the compressed bit stream rather than directly signaling SAO parameters.

In early versions of HEVC, the encoder signals SAO parameters such as the SAO filter type for each color component, and the offsets for each color component in the encoded bit stream. Table 2 is one example illustrating the types and number of offsets that may be signaled for each color component. More specifically, Table 2 shows the SAO filter types (sao_type_idx) and the number of SAO offsets (NumSaoCategory) that are signaled for each filter type as specified in WD5. For SAO filter types 1-4, the four offsets are signaled in category order (see Table 1). For SAO filter types 5 and 6, the 16 offsets are signaled in band order (lowest to highest). Later versions of HEVC have changed the specific combination of syntax elements used to signal the SAO type and offsets in various ways, and some versions reduced the number of offsets signaled for band offset filter types. Further, as previously mentioned, later versions of HEVC provide a merge flag for each color component that may be used to signal that the SAO parameters of that color component are "merged" with those of the corresponding color component of an upper or left neighboring LCU in lieu directly signaling the SAO parameters.

TABLE 2

| sao_type_idx | NumSaoCategory | Edge type |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

Embodiments of the invention provide alternative techniques for signaling of SAO information that may reduce the coding rate for signaling such information in the compressed bit stream. More specifically, techniques are provided that allow SAO information common to two or more of the color components to be signaled using one or more syntax elements (flags or indicators) representative of the common information. These techniques reduce the need to signal SAO information separately for each color component. A syntax element that may be used to represent SAO information common to more than one color component is referred to as a combined flag or combined SAO flag herein.

As used herein in describing various embodiments, the term "SAO parameters" refers to a combination of syntax elements that together indicate the type of filtering to be applied, i.e., BO or EO or none, the offset values to be used, and any other information needed in order to apply the offset values. SAO may be specified in different ways in coding standards and the number of parameters (syntax elements) and the semantics of the parameters are defined by the particular coding standard specification. For example, in the SAO of WD5 previously described herein, the parameters include a filter type and the offset values for that filter type. Further, the semantics of the filter type parameter are such that edge direction is communicated for EO type filtering and the bands to which offsets are to be applied are communicated for BO type filtering (see Table 2). In addition, the semantics of the filter type parameter also communicate the number of offsets and whether or not SAO is enabled.

In another example, the parameters of the SAO filter in HEVC Draft 8 are as follows: 1) a filter type that is 0 if no SAO is to be applied, 1 for BO type filtering, and 2 for EO type filtering; 2) four offset values that are the absolute values of the actual offset values; 3) the signs of each non-zero offset value (for BO type filtering); 4) a band position (for BO type filtering) indicating the left-most band of four consecutive bands where the offsets are to be applied; and 5) an EO class (for EO type filtering) that indicates the edge direction (See Table 3). The signs for the offset values for EO type filtering are inferred from the category, i.e., plus for categories 1 and 2, and minus for categories 3 and 4. Unless otherwise explicitly stated herein, embodiments of the invention are not limited to any particular SAO specification.

TABLE 3

| EO Class | Edge Direction |
|---|---|
| 0 | 1D 0-degree edge offset |
| 1 | 1D 90-degree edge offset |
| 2 | 1D 135-degree edge offset |
| 3 | 1D 45-degree edge offset |

As used herein in describing various embodiments, the term "SAO information" refers to the syntax elements encoded in the video bit stream to communicate the SAO parameters to a decoder. The content of the "SAO information" may be different depending on the particular coding standard. For example, SAO information for the color components may be directly encoded SAO parameters, merge flags indicating that SAO parameters of the left neighboring LCU are to be used, or merge flags indicating that SAO parameters of the upper neighboring LCU are to be used. As is explained in more detail herein, the SAO information may include one or more combined flags indicating information that applies to two or more color components. In some embodiments, merge flags may be combined flags.

Some example SAO information signaling using combined SAO flags that may be used in one or more embodiments is now described. For simplicity of explanation, these examples and other embodiments described herein assume that SAO parameters are determined and signaled at the LCU level. One of ordinary skill in the art will understand other embodiments in which other partitioning of a picture for SAO is used.

In many instances, the SAO parameters are the same for the luma component, i.e., the Y component, and the chroma components, i.e., the Cb and Cr components, of an LCU. Accordingly, in some embodiments, this commonality is explicitly signaled and the number of offsets signaled is reduced. Table 4 shows one example of signaling common SAO parameters for color components. In Table 4, a common SAO flag, sao_color_idx, is used to indicate the SAO type for an LCU. This common flag indicates whether or not SAO is applied to the LCU, and, if applied, whether SAO is applied to both luma and chroma using the same parameters or not. In this example, when sao_color_idx is 0, the same SAO parameters are shared by Y, Cb, and Cr. Therefore, only one parameter set is signaled after this flag, rather than requiring the signaling of three parameters sets as in the prior art. When sao_color_idx is 1, SAO is applied only for Y, and only one parameter set is signaled. When sao_color_idx is 2, SAO is not applied to the LCU, and no SAO parameters are signaled. When sao_color_idx is 3, a separate parameter set is signaled for each of Y, Cb, and Cr.

TABLE 4

| sao_color_idx | Description |
| --- | --- |
| 0 | apply the same parameters for Y, Cb, and Cr |
| 1 | apply the parameters to Y only |
| 2 | do not apply SAO |
| 3 | apply separate parameters for Y, Cb, and Cr |

In some embodiments, the sao_color_idx value of 3 is removed. The majority of chroma edge offsets have been observed to be either 0 or 1. Thus, in such embodiments, the value of a chroma edge offset is restricted to be less than or equal to 1 and the same edge offsets are often observed for Cb and Cr. Thus, different offset values can be assigned to luma and chroma using sao_color_idx. For example, in some embodiments, a new value of sao_color_idx may be added to indicate separate parameter sets for Y and Cb/Cr, i.e., to indicate that one parameter set for the Y component and a separate, shared parameter set for the Cb and Cr components are signaled. Another sao_color_idx that may be added is to signal that a shared parameter set is signaled for the Cb and Cr components and none for the Y component.

Table 5 shows another example of signaling common SAO parameters. In this example, specific use of EO or BO may be signaled, as well as use of common offset values.

TABLE 5

| sao_color_idx | Description |
| --- | --- |
| 0 | apply the same EO parameters for Y, Cb, and Cr |
| 1 | apply the EO parameters to Y only |
| 2 | do not apply SAO |
| 3 | apply the same BO parameters for Y, Cb, and Cr |
| 4 | apply separate parameters for Y, Cb, and Cr |

The above signaling may be expanded in various ways. For example, an option may be added to signal the BO parameters for Y only. Another option may be added to signal that there are common EO or BO parameters for the Cb and Cr components and different EO or BO parameters for the Y component. Another option that may be added is to signal that there are common EO or BO parameters for the Cb and Cr components and none for the Y component.

In some embodiments, whether or not SAO is enabled for various combinations of color components in an LCU may be signaled. For example, the signaling of Table 6 may be used. In Table 6, a combined flag sao_enable_idx is provided to signal whether or not SAO is applied for possible combinations of color components. In this table, the code value is assigned according the frequency each combination is expected to occur, i.e., the observed correlations among color components. Given this combined flag, the expected number of other SAO parameters can be determined. For example, for a sao_enable_idx of 7, other SAO parameters indicative of types and offsets are signaled for Cb and Cr components and not for the Y component. Similarly, for a sao_enable_idx of 3, other SAO parameters indicative of types and offsets are signaled for the Y component and the Cb component and not for the Cr component.

TABLE 6

| SAO enable flag | | | sao_en- | |
| --- | --- | --- | --- | --- |
| Y | Cb | Cr | able_idx | Description |
| 0 | 0 | 0 | 0 | Not applying SAO |
| 0 | 0 | 1 | 5 | Applying to Cr only |
| 0 | 1 | 0 | 6 | Applying to Cb only |
| 0 | 1 | 1 | 7 | Applying to Cb and Cr only |
| 1 | 0 | 0 | 1 | Applying to Y only |
| 1 | 0 | 1 | 2 | Applying to Y and Cr only |
| 1 | 1 | 0 | 3 | Applying to Y and Cb only |
| 1 | 1 | 1 | 4 | Applying to Y, Cb, and Cr |

In some embodiments, a separate SAO enable flag, e.g., sao_enable_idx_luma, is provided for the Y component and a combined flag is provided for signaling SAO enablement of various combinations of the Cb and Cr components. For example, the signaling of Table 7 may be used for the Cb and Cr components. In Table 7, four values can be assigned to sao_enable_idx_chroma. In such embodiments, the SAO enable flag for the Y component may be signaled in the compressed bit stream followed by combined flag for SAO enablement of the Cb and Cr components, e.g., sao_enable_idx_chroma. In some embodiments, the combined flag for the Cb and Cr components is signaled when the SAO enable flag for the Y component indicates that SAO is enabled for the Y component; otherwise this latter flag is not signaled and inferred to be 0.

TABLE 7

| SAO enable flag | | sao_en- | |
|---|---|---|---|
| Cb | Cr | able_idx_chroma | Description |
| 0 | 0 | 0 | Not applying SAO to Cb and Cr |
| 0 | 1 | 1 | Applying to Cr only |
| 1 | 0 | 2 | Applying to Cb only |
| 1 | 1 | 3 | Applying to Cb and Cr |

In some embodiments, one or more combined flags may also be used for signaling the merging of SAO parameters with the left or upper neighboring LCU. Rather than signaling a merge up or merge left flag for each color component as appropriate as in the prior art, combined merge left and merge up flags may be used to indicate, for example, that the parameters for all three color components are merged, respectively, with those of the left or upper neighboring LCU, or that various combinations of the color components are merged. For example, in some embodiments, the signaling of Table 8 may be used. As shown in Table 8, a combined flag, merge_flag_idx, is used to indicate whether or not the SAO parameters for the color components of an LCU are merged with those of the left or upper neighboring LCU. When merge_flag_idx is 0, the SAO parameters for the Y, Cb and Cr components are merged with those of the left neighboring LCU. When merge_flag_idx is 1, the SAO parameters for the Y, Cb and Cr components are merged with those of the upper neighboring LCU. When merge_flag_idx is 2, nothing is merged, and the SAO parameters for the Y, Cb and Cr components are signaled. When merge_flag_idx is 3, the SAO parameters for the Cb and Cr components are merged with those of the left neighboring LCU, but not the SAO parameters for the Y component. When merge_flag_idx is 4, the SAO parameters for the Cb and Cr components are merged with those of the upper neighboring LCU, but not the SAO parameters for the Y component. When merge_flag_idx is 3 or 4, the SAO parameters for the Y component are signaled.

TABLE 8

| merge_flag_idx | Description |
|---|---|
| 0 | SAO parameters for Y, Cb and Cr are merged with a left LCU |
| 1 | SAO parameters for Y, Cb and Cr are merged with a upper LCU |
| 2 | no Merge |
| 3 | SAO parameters are merged with a left LCU only for Cb and Cr, but not for Y |
| 4 | SAO parameters are merged with a upper LCU only for Cb and Cr, but not for Y |

Figure 3:
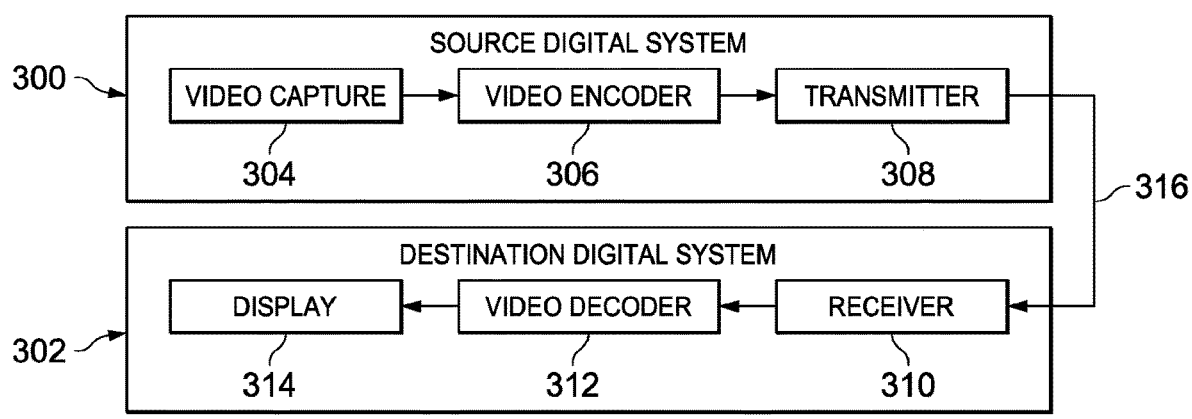
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform SAO parameter signaling during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to perform SAO filtering during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
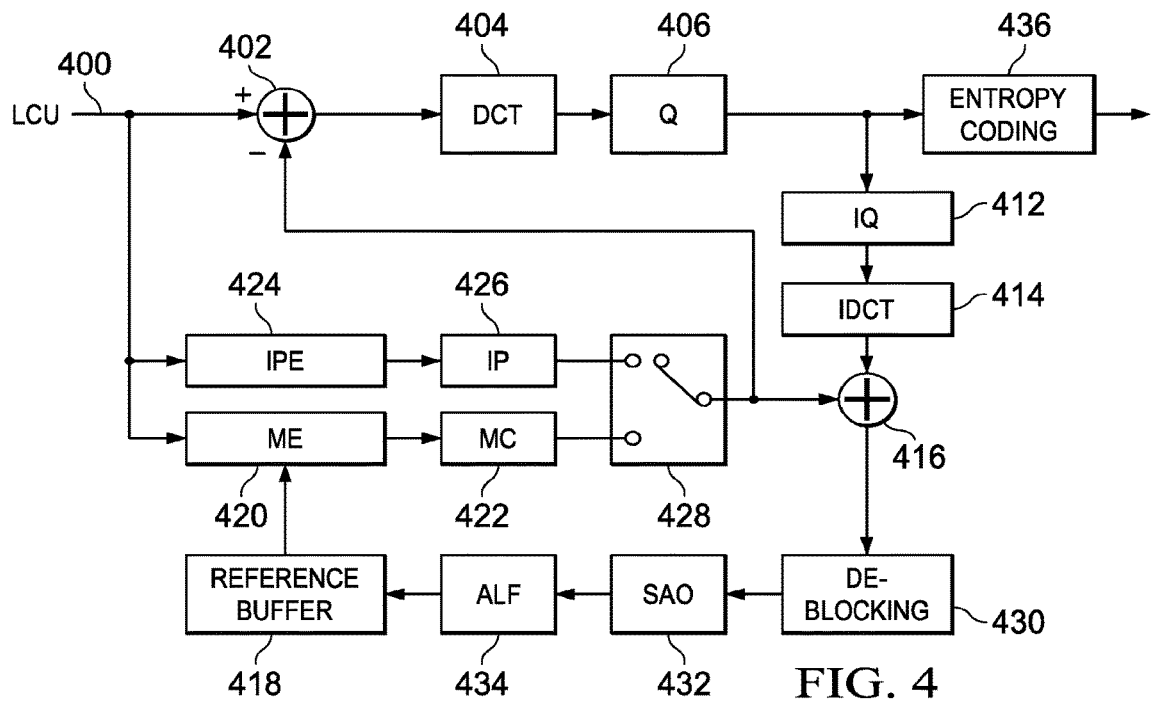
FIG. 4 is a block diagram of a video encoder.

FIG. 4 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy encoder 634 also codes relevant data from the in-loop filtering component 616 such as the LCU specific SAO information for each LCU. The LCU SAO information may be signaled on an LCU-by-LCU basis, e.g., the SAO information for an LCU may be signaled in the compressed bit stream immediately before encoded transform coefficients of the CUs.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

In general, for each LCU of the reconstructed picture, the SAO filter 432 determines the best offset values, i.e., band offset values or edge offset values, to be added to pixels of that LCU to compensate for intensity shift that may have occurred during the block based coding of the picture, applies the offset values to the reconstructed LCU, and determines the SAO information to be encoded in the bit stream for the LCU. The operation of embodiments of the SAO filter 432 is described in more detail herein in reference to the method of FIG. 6.

Figure 5:
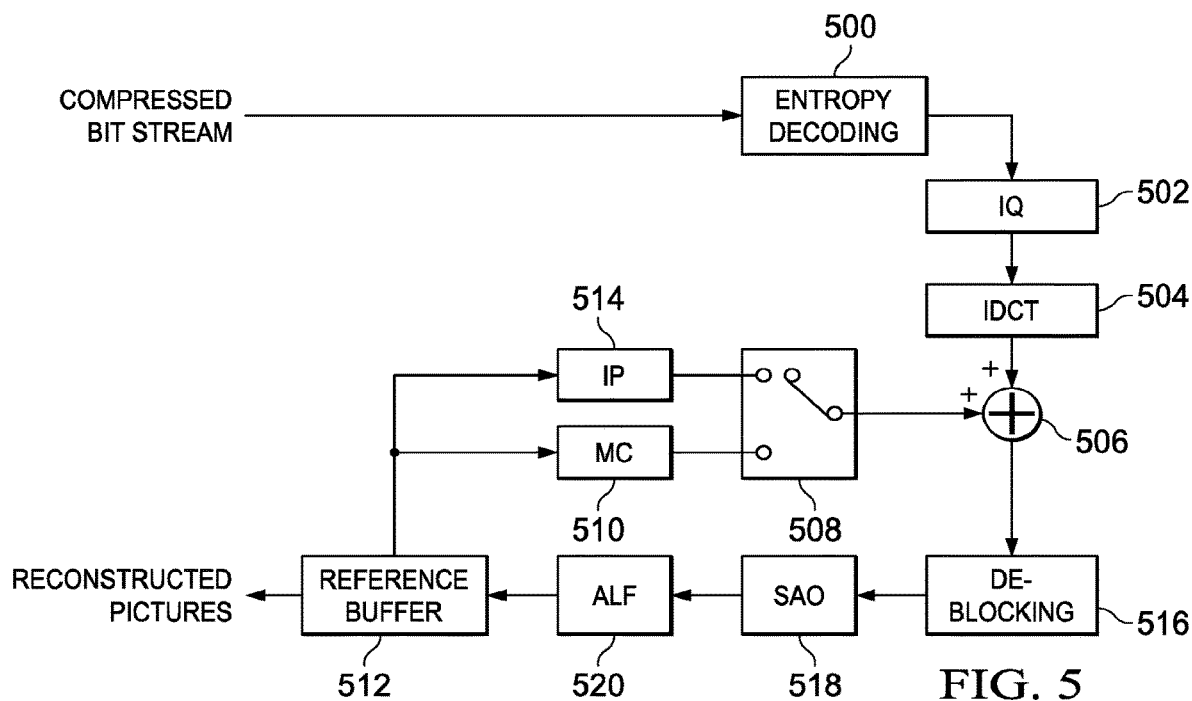
FIG. 5 is a block diagram of a video decoder.

FIG. 5 is a block diagram of an example video decoder. The video decoder operates to reverse the encoding operations, i.e., entropy coding, quantization, transformation, and prediction, performed by the video encoder of FIG. 4 to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, LCU specific SAO information, etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

The deblocking filter 516 applies the same deblocking as performed in the encoder. In general, for each reconstructed LCU, the SAO filter 518 applies the offset values determined by the encoder for the LCU to the pixels of the LCU. More specifically, the SAO filter 518 receives decoded LCU specific SAO information from the entropy decoding component 500 for each reconstructed LCU, determines the SAO parameters for the LCU from the SAO information, and applies the determined offset values to the pixels of the LCU according to values of other parameters in the SAO parameter set. The operation of embodiments of the SAO filter 518 for each LCU is described in more detail herein in reference to the method of FIG. 7.

Figure 6:
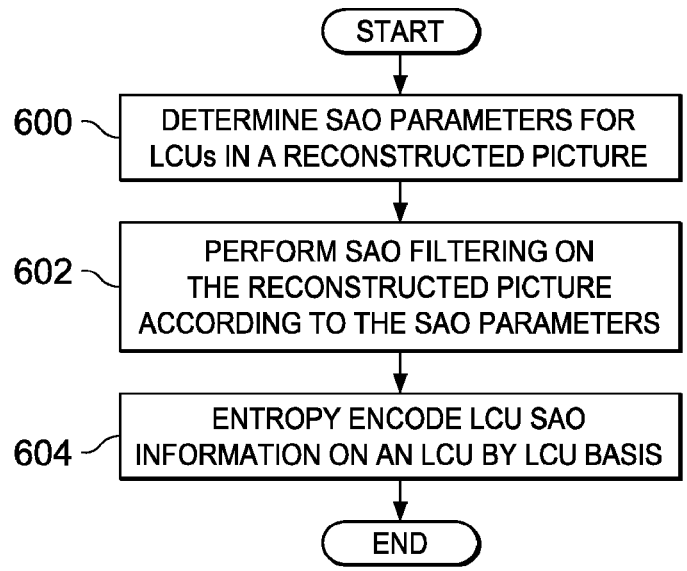
FIG. 6 is a flow diagram of a method for SAO signaling in an encoder.

FIG. 6 is a flow diagram of a method for SAO filtering and SAO parameter signaling that may be performed in a video encoder, e.g., the encoder of FIG. 4. In general, in this method, SAO parameters are determined for each LCU in a picture, SAO filtering is performed on each LCU according to the SAO parameters determined for the LCU, and SAO information for each LCU is encoded in the bit stream interleaved with the LCU data. In an encoder, method steps 600 and 602 may be performed by an SAO filter, e.g., SAO filter 432 of FIG. 4, and method step 604 may be performed by an entropy encoder, e.g., entropy coding component 436 of FIG. 4.

Referring now to FIG. 6, SAO parameters are determined 600 for reconstructed LCUs in a reconstructed picture. That is, SAO parameters are determined for each LCU in the reconstructed picture. Any suitable technique may be used for determining the LCU SAO parameters. Further, as part of determining the SAO parameters for an LCU, the encoder may decide that the SAO parameters of one or more color components of left neighboring LCU or a top neighboring LCU are to be used for SAO filtering of the corresponding color components of the LCU, i.e., the parameters are merged.

Once the SAO parameters for an LCU are determined, the SAO information to be encoded in the bit stream for that LCU is also determined. This SAO information may be the actual SAO parameters for each color component or if there is common information across two or more color components, one or more combined flags may be used to signal the common information. For example, in some embodiments, a combined flag may be used to signal whether or not SAO is enabled for some combination of color components, e.g., for all three color components, for a single color component, for two of the color components, etc. Examples of such combined flags are previously described herein. In some embodiments, a combined flag may be used to signal that the same SAO parameters are to be used for some combination of the color components. Examples of such combined flags are previously described herein. Any suitable technique may be used to determine whether or not the same parameters are to be used for two or more color components. In some embodiments, a combined flag may be used to signal the merging of SAO parameters with the left or upper LCU. An example of such a combined flag is previously described herein.

SAO filtering is then performed 602 on the reconstructed picture according to the SAO parameters determined for the LCUs. More specifically, SAO filtering is performed on each LCU according to the particular SAO parameters determined for that LCU. In general, the SAO filtering applies the specified offsets in the SAO parameters to pixels in the LCU according to the filter type indicated in the SAO parameters.

The LCU specific SAO information for each LCU is also entropy coded 604 into the compressed bit stream on an LCU by LCU basis, i.e., the LCU specific SAO information is interleaved with the LCU data in the compressed bit stream.

Figure 7:
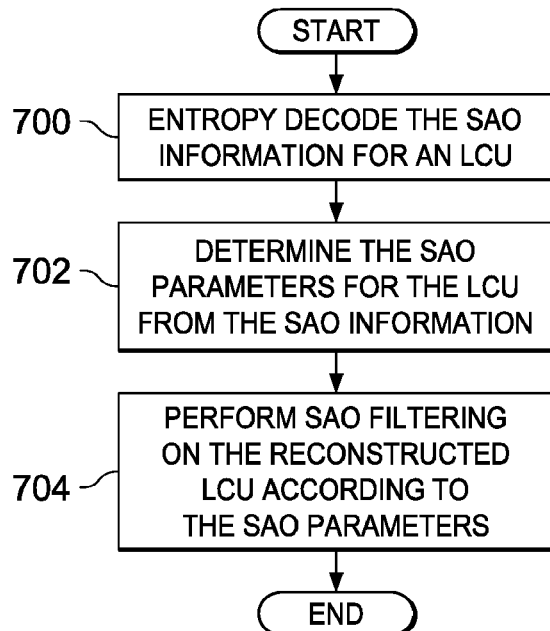
FIG. 7 is a flow diagram of a method for SAO filtering in a decoder.

FIG. 7 is a flow diagram of a method for SAO filtering that may be performed in a video decoder, e.g., the decoder of FIG. 5. In general, in this method, the SAO information for an LCU encoded in a compressed video bit stream as per an embodiment of the method of FIG. 6 is entropy decoded, the SAO parameters for the LCU are determined from the decoded SAO information, and SAO filtering is performed on the reconstructed LCU according to the determined SAO parameters. In a video decoder, method steps 702 and 704 may be performed by an SAO filter, e.g., SAO filter 518 of FIG. 5, and method step 1700 may be performed by an entropy decoder, e.g., entropy decoder 500 of FIG. 5.

Referring now to FIG. 7, initially the SAO information for an LCU is entropy decoded 700. As was previously mentioned, this SAO information may include one or more combined flags signaling common information for two or more color components of the LCU.

The SAO parameters for the LCU are then determined 702 from the SAO information. In embodiments in which the SAO information includes one or more combined flags, the decoded SAO information is further analyzed to determine the SAO parameters for each color component. Given the benefit of the foregoing description of combined flags that may be used in embodiments of the encoding method of FIG. 6, one of ordinary skill in the art will understand how the SAO parameters may be determined using the decoded SAO information when one or more combined flags are used in encoding without need for further written description.

SAO filtering is then performed 704 on the reconstructed LCU according to the determined SAO parameters. In general, the SAO filtering applies the specified offsets in the SAO parameters to pixels in the LCU according to the filter type indicated in the SAO parameters.

Figure 8:
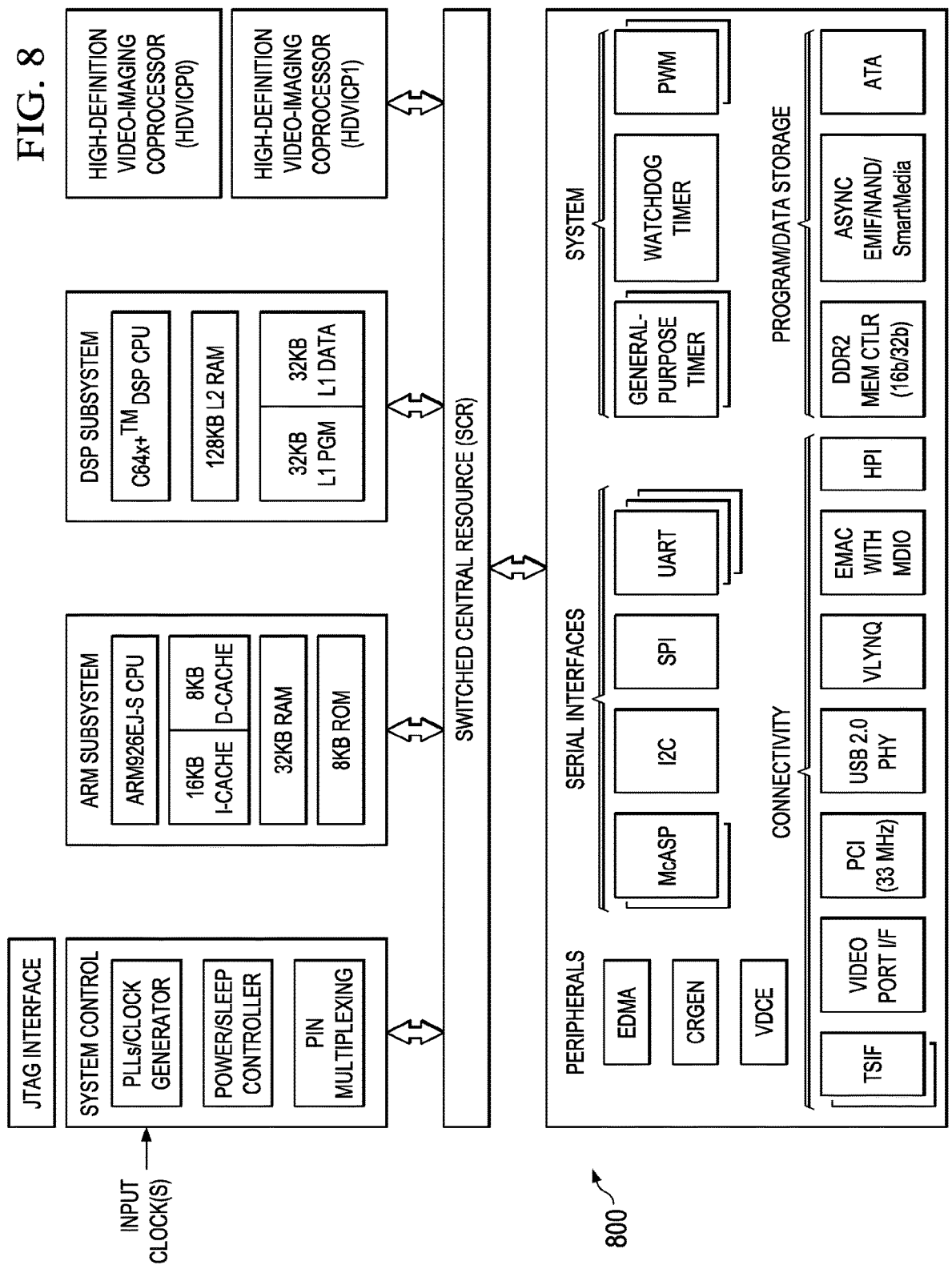
FIG. 8 is a block diagram of an illustrative digital system.

FIG. 8 is a block diagram of an example digital system suitable for use as an embedded system that may be configured to perform SAO filtering and SAO parameter signaling as described herein during encoding of a video stream and/or SAO filtering during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to perform SAO filtering and SAO parameter signaling during video encoding and/or SAO filtering during decoding of an encoded video bitstream using methods described herein. For example, the coding control of the video encoder of FIG. 4 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the SAO filtering and SAO parameter signaling during encoding of a video stream may also be executed on the HDVICP coprocessors. Similarly, at least some of the computational operations of the various components of the video decoder of FIG. 5, including entropy decoding, inverse quantization, inverse transformation, intra-prediction, and motion compensation may be executed on the HDVICP coprocessors. Further, at least some of the computational operations of the SAO filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, particular SAO filter types, edge directions, pixel categories, numbers of offset values, etc., drawn from versions of the emerging HEVC standard have been described above. One of ordinary skill in the art will understand embodiments in which the SAO filter types, edge directions, pixel categories, number of offset values, and/or other specific details of SAO filtering differ from the ones described.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A system comprising:
a receiver configured to receive a bit stream; and
a decoder coupled to the receiver and configured to:
decode a first flag in the bit stream, wherein the first flag indicates that edge offset sample adaptive offset (SAO) filtering of a luma component is not enabled;
decode a second flag in the bit stream, wherein the second flag indicates that edge offset SAO filtering of chroma components is enabled; and
apply edge offset SAO filtering to the chroma components based on the second flag.

2. The system of claim 1, wherein the second flag is a combined merge flag signaling that edge offset SAO parameters of a left neighboring coding unit are to be used for a current coding unit.

3. The system of claim 1, wherein the second flag is a combined merge flag signaling that edge offset SAO parameters of a top neighboring coding unit are to be used for a current coding unit.

4. The system of claim 1, wherein the decoder is configured to decode a combined flag in the bit stream,
wherein the combined flag indicates that the chroma components share SAO parameters.

5. The system of claim 1,
wherein to decode the first flag, the decoder is configured to extract the first flag from the bit stream, and
wherein to decode the second flag, the decoder is configured to extract the second flag from the bit stream.

6. The system of claim 1, wherein the decoder is configured to decode the second flag after decoding the first flag.

7. The system of claim 1, wherein the first flag is a separate syntax element from the second flag.

8. A system comprising:
a decoder configured to:
decode a first flag in a bit stream, wherein the first flag indicates that edge offset sample adaptive offset (SAO) filtering of a luma component is not enabled;
decode a second flag in the bit stream, wherein the second flag indicates that edge offset SAO filtering of chroma components is enabled; and
apply edge offset SAO filtering to the chroma components based on the second flag to generate a reconstructed image; and
a display coupled to the decoder and configured to display the reconstructed image.

9. The system of claim 8, wherein the display includes a light emitting diode display configured to display the reconstructed image.

10. The system of claim 8, wherein the display includes a liquid crystal display configured to display the reconstructed image.

11. The system of claim 8, wherein the second flag is a combined merge flag signaling that edge offset SAO parameters of a left neighboring coding unit are to be used for a current coding unit.

12. The system of claim 8, wherein the second flag is a combined merge flag signaling that edge offset SAO parameters of a top neighboring coding unit are to be used for a current coding unit.

13. The system of claim 8, further comprising decoding a combined flag in the bit stream,
wherein the combined flag indicates that the chroma components share SAO parameters.

14. The system of claim 8,
wherein to decode the first flag, the decoder is configured to extract the first flag from the bit stream, and
wherein to decode the second flag, the decoder is configured to extract the second flag from the bit stream.

15. The system of claim 8, wherein the decoder is configured to decode the second flag after decoding the first flag.

16. The system of claim 8, wherein the first flag is a separate syntax element from the second flag.

17. A method comprising:
decoding a first flag in a bit stream, wherein the first flag indicates that edge offset sample adaptive offset (SAO) filtering of a luma component is not enabled;
decoding a second flag in the bit stream, wherein the second flag indicates that edge offset SAO filtering of chroma components is enabled; and
applying edge offset SAO filtering to the chroma components based on the second flag.

18. The method of claim 17, further comprising:
generating a reconstructed image by applying the edge offset SAO filtering to the chroma components; and
displaying the reconstructed image via a light emitting diode display.

19. The method of claim 17, further comprising:
generating a reconstructed image by applying the edge offset SAO filtering to the chroma components; and
displaying the reconstructed image via a liquid crystal display.

20. The method of claim 17,
wherein decoding the second flag occurs after decoding the first flag, and
wherein the first flag is a separate syntax element from the second flag.

* * * * *